United States Patent
Sandrew

(10) Patent No.: US 12,165,655 B1
(45) Date of Patent: *Dec. 10, 2024

(54) SYSTEM THAT CONDUCTS DIALOGS USING ARTIFICIAL INTELLIGENCE

(71) Applicant: SANDREW & COMPANY, LLC, Encinitas, CA (US)

(72) Inventor: Barry Sandrew, Encinitas, CA (US)

(73) Assignee: SANDREW & COMPANY, LLC, Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,998

(22) Filed: May 21, 2024

Related U.S. Application Data

(63) Continuation of application No. 18/483,078, filed on Oct. 9, 2023, now Pat. No. 11,990,139.

(51) Int. Cl.

| | | |
|---|---|---|
| *G10L 15/00* | (2013.01) | |
| *G06F 3/16* | (2006.01) | |
| *G06F 40/58* | (2020.01) | |
| *G06V 20/50* | (2022.01) | |
| *G10L 13/02* | (2013.01) | |

(Continued)

(52) U.S. Cl.
CPC .............. *G10L 17/22* (2013.01); *G06F 3/167* (2013.01); *G06F 40/58* (2020.01); *G06V 20/50* (2022.01); *G10L 13/02* (2013.01); *G10L 17/14* (2013.01)

(58) Field of Classification Search
CPC ........ G06F 16/738; G06F 40/35; G06F 40/40; G10L 15/22
See application file for complete search history.

(56) References Cited

U.S. PATENT DOCUMENTS

2022/0230001 A1* 7/2022 Johnson ................ G06F 40/284
2023/0068338 A1* 3/2023 Ramnani ................ G06F 40/35

OTHER PUBLICATIONS

9to5google.com, "[Update: Now on Android] Socratic is Google's AI studying tool for HS, College Students", published on Feb. 17, 2020; retrieved from https://9to5google.com/2020/02/17/socratic-bygoogle (4 pages).

(Continued)

*Primary Examiner* — Daniel Abebe
(74) *Attorney, Agent, or Firm* — ARC IP Law, PC; Joseph J. Mayo

(57) ABSTRACT

An artificial intelligence system that conducts dialogs with one or more participants to achieve an educational outcome, such as teaching material with a Socratic question-and-answer method, reviewing material to reinforce ideas or to prepare a participant for future tests or events, or evaluating a participant's knowledge or communication skills. The system may use an artificial intelligence engine that can understand and generate natural language, such as a large-language model like ChatGPT. Text-to-speech and speech-to-text converters may be coupled to the AI engine to enable the system to communicate directly with participants using spoken language. The system may provide an interface for entry of contextual information for a dialog, such as background information on topics for discussion. It may provide an interface for moderation of a dialog, for example by a teacher, lawyer, thesis advisor, etc. System may evaluate the performance of the participants at the end of a dialog.

21 Claims, 9 Drawing Sheets

(51) Int. Cl.
  *G10L 17/14* (2013.01)
  *G10L 17/22* (2013.01)

(56) References Cited

OTHER PUBLICATIONS

"What are Rubrics", retrieved from https://community.canvaslms.com/t5/Canvas-Basics-Guide/What-are-Rubrics/ta-p/35 on Oct. 6, 2023 (3 pages).

cornell.edu, Center for Teaching Innovation, "Using Rubrics", retrieved from https://teaching.cornell.edu/teaching-resources/assessment-evaluation/using-rubrics on Oct. 6, 2023 (3 pages).

Trunitin, "Turnitin's AI Writing detection available now", retrieved from https://www.turnitin.com/solutions/ai-writing on Oct. 6, 2023 (15 pages).

Google Play, "Socratic by Google", retrieved from https://play.google.com/store/apps/details?id=com.google.socratic on Oct. 6, 202 (4 pages).

Education Management Solutions (EMS), "Healthcare Simulation Training; Integrated Solutions Elevated Healthcare" retrieved from https://ems-works.com on Oct. 6, 2023 (7 pages).

Centre for Teaching Excellence, "Rubrics: Useful Assessment Tool" retrieved from https://uwaterloo.ca/centre-for-teaching-excellence/catalogs/tip-sheets/rubrics-useful-assessment-tool, on Oct. 6, 2023 (5 pages).

Turnitin, "Empower Students to do their best original work", retrieved from https://www.turnitin.com on Oct. 6, 2023 (10 pages).

Educational App Store, "Socratic" retrieved from https://www.educationalappstore.com/app/socratic-by-google on Oct. 8, 2023 (8 pages).

Balla, Erika, "Automated Grading System: How AI is Revolutionizing Exam Evaluation" published on May 31, 2023; retrieved from https://www.datasciencecentral.com/automated-grading-systems-how-ai-is-revolutionizing-exam-evaluation/ (6 pages).

Khan Academy, "Sal Khan's 2023 Ted Tal: AI in the Classroom can transform education", posted May 1, 2023; retrieved from https://blog.khanacademy.org/sal-khans-2023-ted-talk-ai-in-the-classroom-can-transform-education/ (5 pages).

theconversation.com, "Why Universities should return to oral exams in the AI and ChatGPT era", published on Apr. 19, 2023; retrieved from https://theconversation.com/why-universities-should-return-to-oral-exams-in-the-ai-and-chatgpt-era-203429 (4 pages).

Syme, Pete, "A Princeton student built an app which can detect if Chat GPT wrote an essay to combat AI-based plagiarism"; published on Jan. 4, 2023; retrieved from https://www.businessinsider.com/app-detects-if-chatgpt-wrote-essay-ai-plagiarism-2023-1; (6 pages).

Renard, Lucie, "How to create digital rubrics for your student evaluations"; published on Apr. 26, 2022; retrieved from https://www.bookwidgets.com/blog/2022/04/how-to-create-digital-rubrics-for-your-student-evaluations-the-teacher-quide-on-rubrics (18 pages).

Kumar, Anmol, "The Role of AI in Checking Plagiarized Text"; retrieved from https://learn.g2.com, Mar. 3, 2020 (8 pages).

U.S. Appl. No. 18/483,078, filed Oct. 9, 2023.

* cited by examiner

FIG. 1F

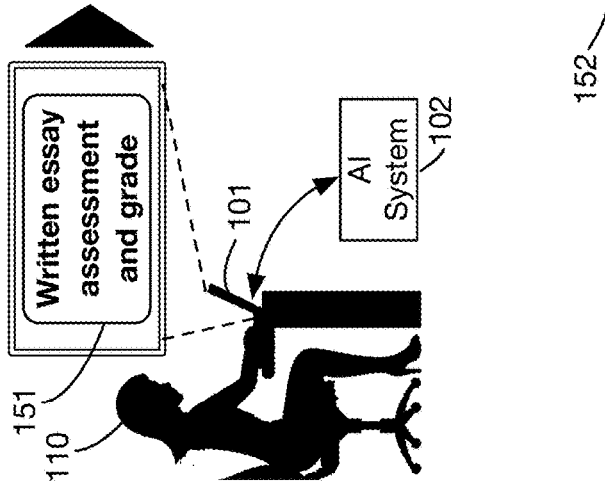

Student: Jack Jacob  Evaluation of: Written Essay, 2023-09-15

Suggested grade: B-

Structure and Formatting
The essay is formatted with bullet points rather than conventional paragraph structures. This is not consistent with the formal style typically expected in academic writing, including APA 7th Edition formatting. The references are listed properly, but in-text citations are lacking in some areas. Subheadings are used, which is appropriate for APA style, but the use of bullet points under the headings does not align with standard essay formatting.

Content and Clarity
The content covers the questions posed in the assignment thoroughly. The information is relevant, and the paper provides detailed insights into the different aspects of the topic. The writing is mostly clear, but the use of bullet points might have led to less cohesion in the flow of ideas.

Coherence and Cohesion
The essay follows a logical sequence, addressing each question in a clear and systematic way. Transitions between points are not always smooth, which can be attributed to the bullet-point style of writing.

Adherence to Instructions
The essay addresses the assignment questions and offers comprehensive insights into each of them. The length of the paper falls within the specified range.

Referencing
While references are cited at the end, in-text citations are not consistently applied. Some statements could be strengthened with empirical evidence or references to authoritative sources.

Summary
The content and insights provided in the essay are commendable. However, the formatting issues, the lack of smooth transitions, and inconsistencies in citation impact the overall grade.

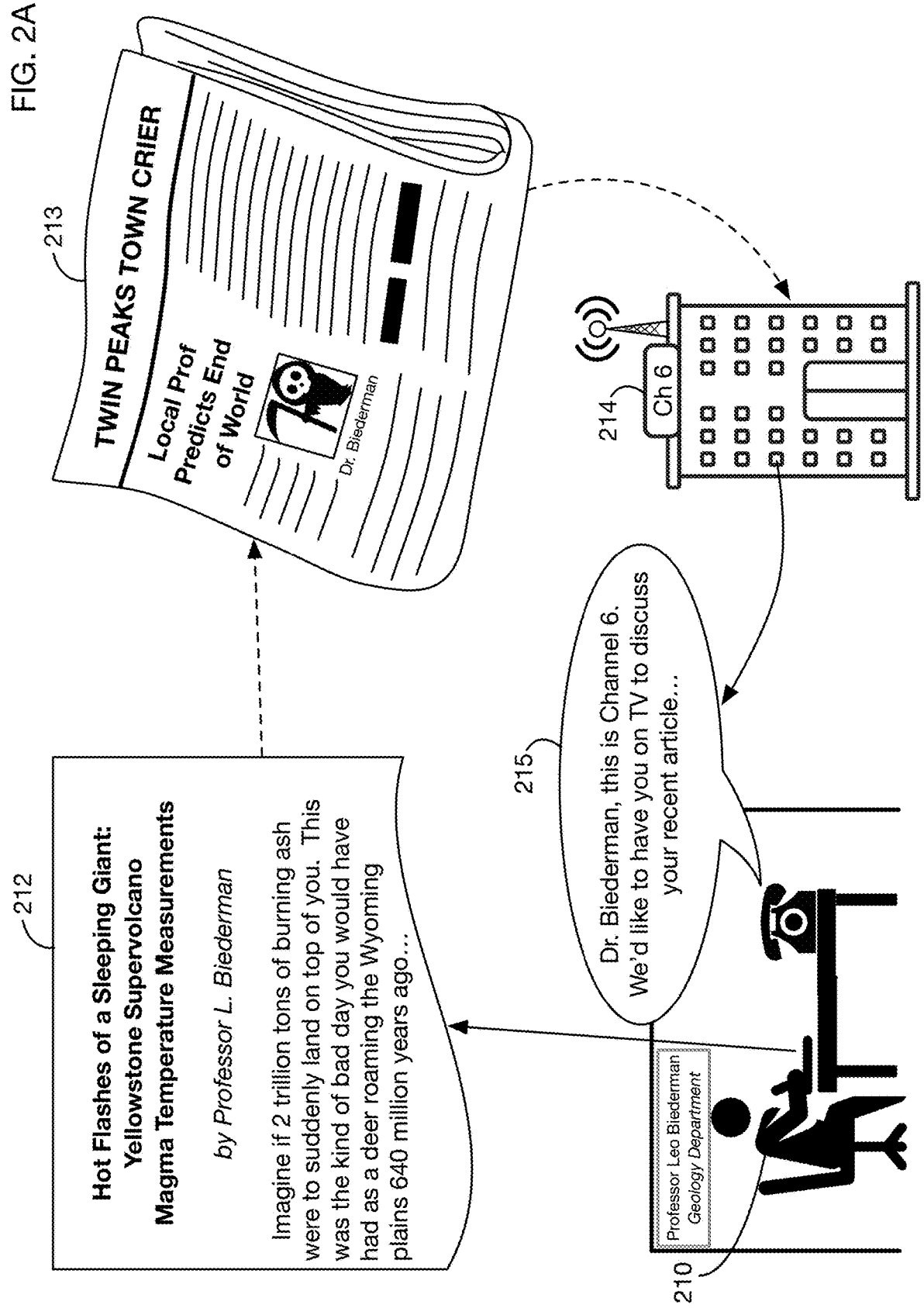

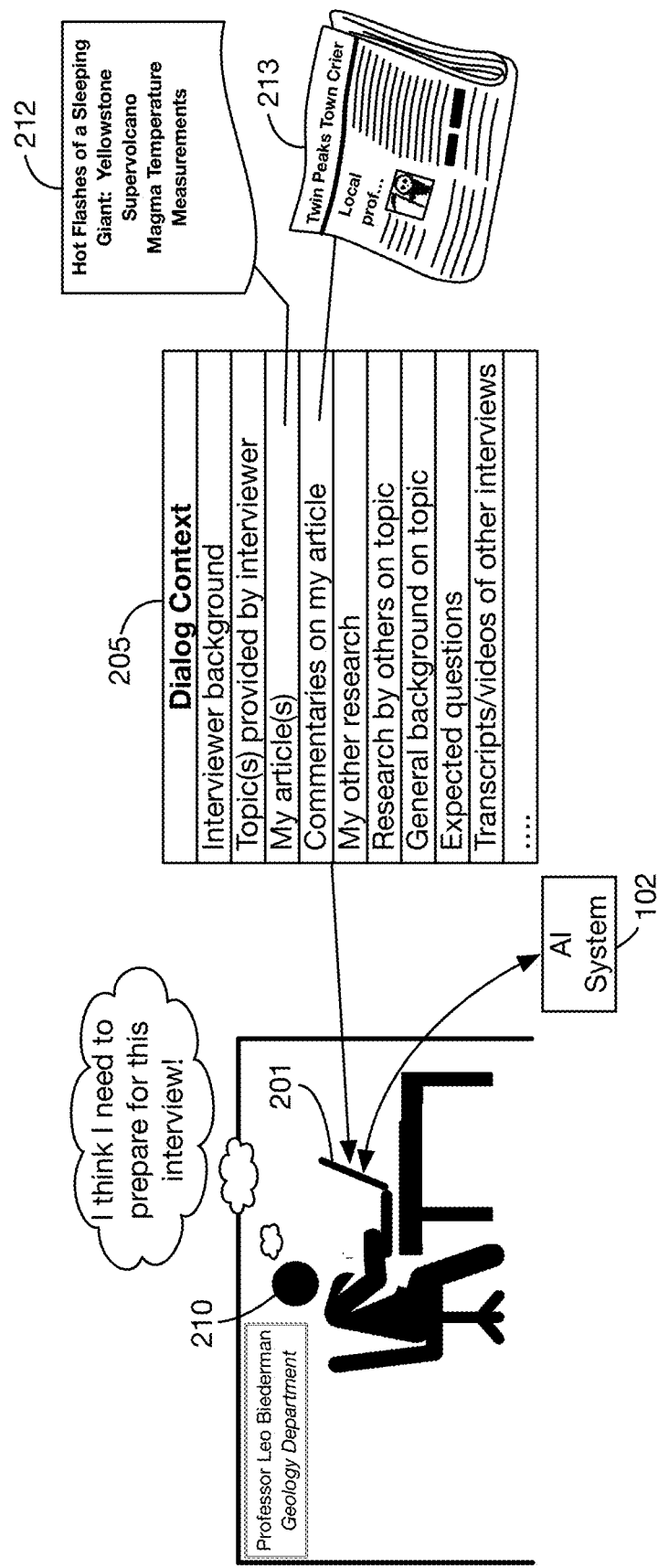

FIG. 2D

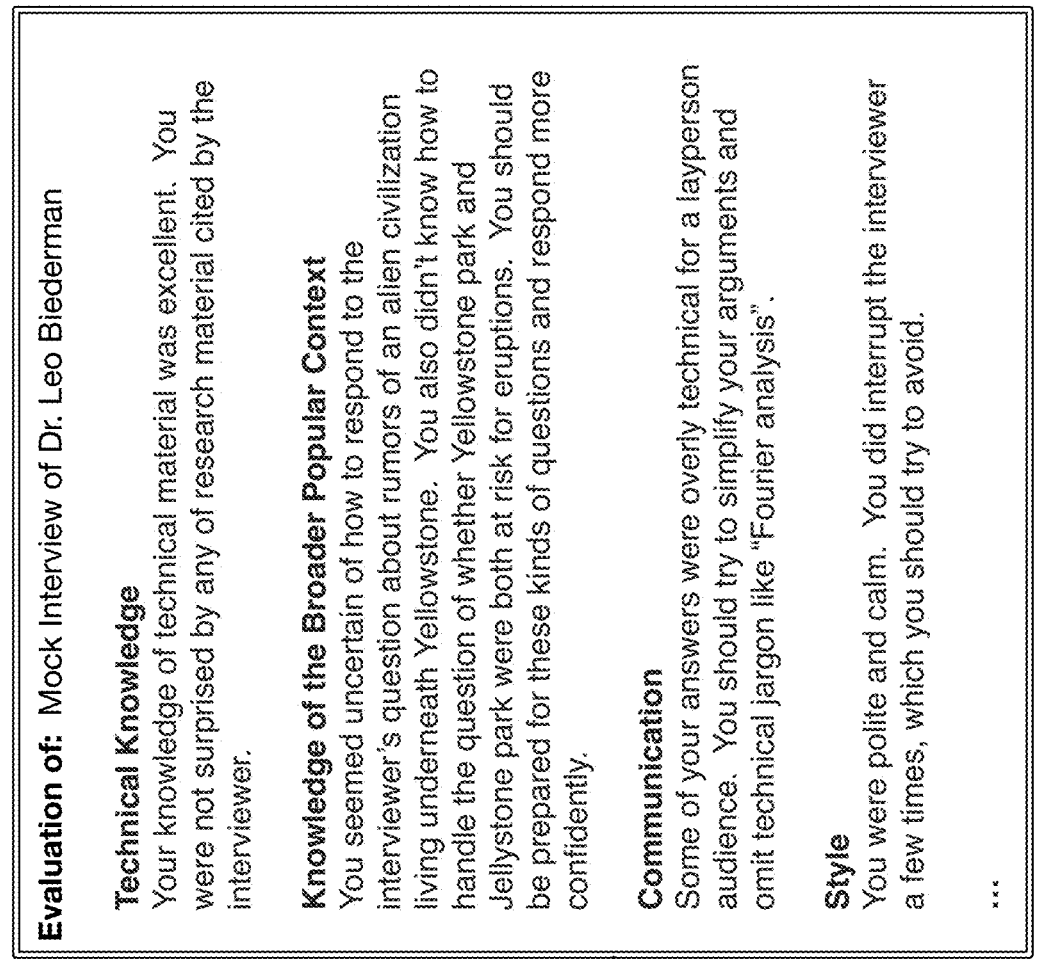

Evaluation of: Mock Interview of Dr. Leo Biederman

Technical Knowledge
Your knowledge of technical material was excellent. You were not surprised by any of research material cited by the interviewer.

Knowledge of the Broader Popular Context
You seemed uncertain of how to respond to the interviewer's question about rumors of an alien civilization living underneath Yellowstone. You also didn't know how to handle the question of whether Yellowstone park and Jellystone park were both at risk for eruptions. You should be prepared for these kinds of questions and respond more confidently.

Communication
Some of your answers were overly technical for a layperson audience. You should try to simplify your arguments and omit technical jargon like "Fourier analysis".

Style
You were polite and calm. You did interrupt the interviewer a few times, which you should try to avoid.

...

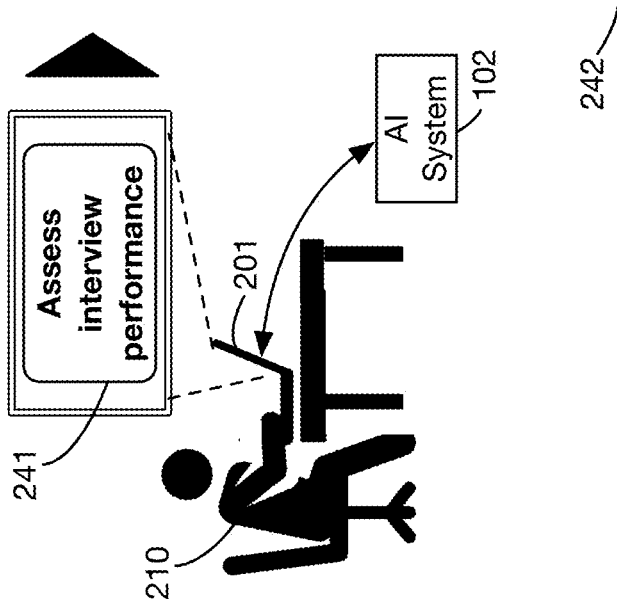

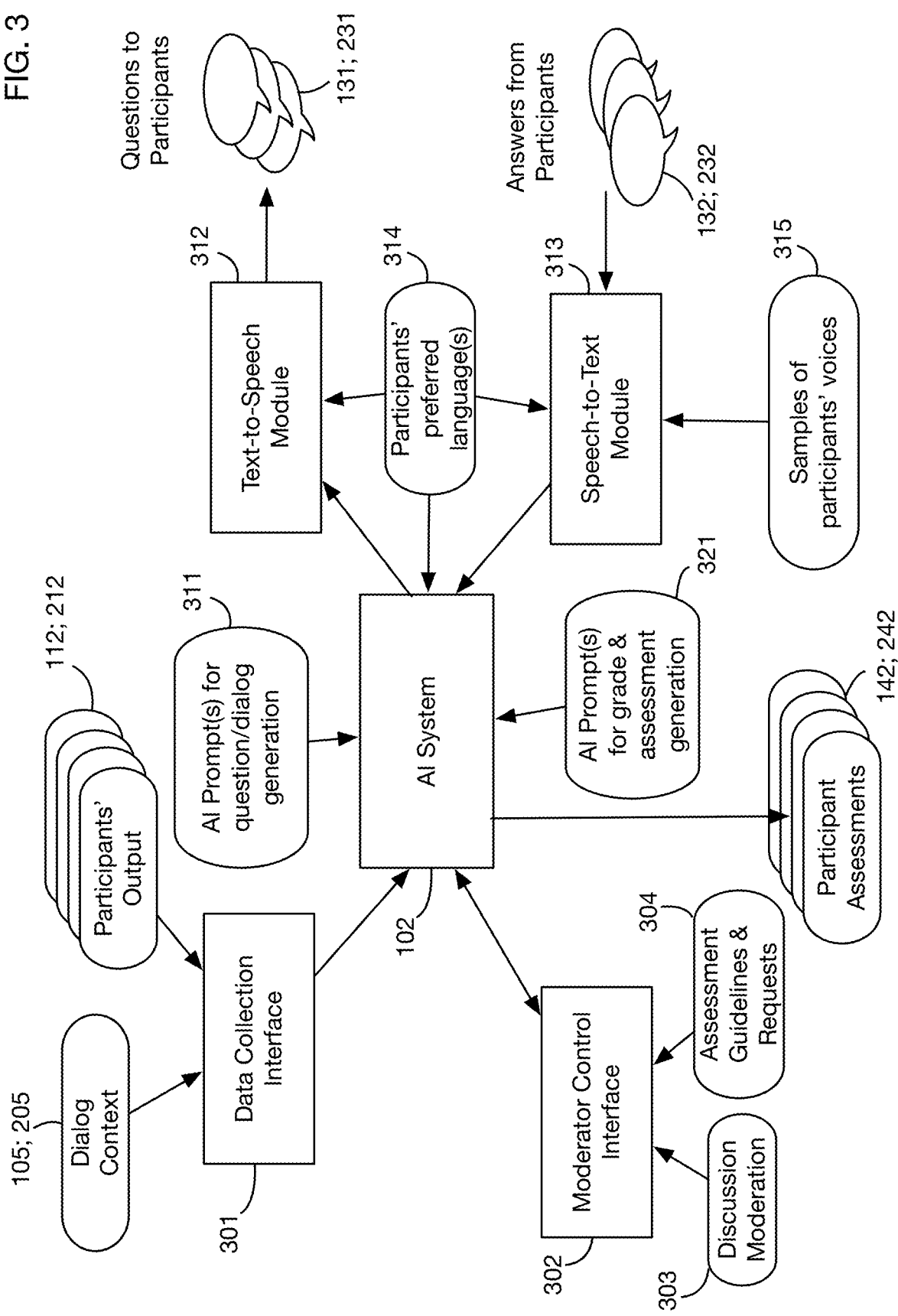

SYSTEM THAT CONDUCTS DIALOGS USING ARTIFICIAL INTELLIGENCE

This application is a continuation of U.S. Utility patent application Ser. No. 18/483,078, filed 9 Oct. 2023, the specification of which is hereby incorporated herein by reference.

BACKGROUND OF THE INVENTION

Field of the Invention

One or more embodiments of the invention are related to the field of information processing. More particularly, but not by way of limitation, one or more embodiments of the invention enable a system that conducts dialogs using artificial intelligence, for example based on defined data sets.

Description of the Related Art

Chatbots and similar systems are available for general text-based discussions with users. Recently artificial intelligence engines like ChatGPT have been integrated into these systems to improve language understanding and to provide more complete responses due to pretraining on very large data sets. These systems have several limitations that prevent them from being fully effective educational tools, or otherwise for conducting dialogs in general, i.e., to ensure a user's comprehension of a topic, for use in generating dialogs for depositions, etc.

First, known systems typically interact with one user at a time. Second, most AI systems require that users interact using text, which requires the users to use an input device to type and to read a screen to see responses. Third, the discussions with a chatbot are focused on general topics rather than on specific objectives including educational objectives for example or for reviewing or reinforcing material that a person desires to gain a command over. Fourth, discussions with a chatbot are unmoderated, providing no role for a teacher in guiding discussion. Fifth, existing systems simply respond to input and do not evaluate the quality of the responses from discussion participants.

For at least the limitations described above there is a need for a system that conducts dialogs using artificial intelligence, including educational dialogs, deposition dialogs, thesis defense practice or any other scenario involving asking questions to test the recall and comprehension of reference data.

BRIEF SUMMARY OF THE INVENTION

One or more embodiments of the invention may enable a system that conducts dialogs using artificial intelligence. Specifically, one or more embodiments of the invention may use an artificial intelligence (AI) engine to guide, facilitate, conduct, and evaluate a dialog between the AI engine and one or more participants. A dialog may be used for example to test a participant's understanding of a subject or of a particular text or output, including the participant's own output. A dialog may be used to explain a subject to one or more participants using a Socratic method of questions and answers, where the questions may be provided by the AI engine. A dialog may be used to help a participant review material and prepare for example for an interview or a subsequent examination, such as a thesis defense. A dialog may for example include an oral examination to confirm that students have written their own essays and have not simply copied-and-pasted material or used an AI system to write their essays, or to verify that they at least understand the material even if they did copy other sources. A dialog managed by the system may have multiple participants, and the system may generate questions and topics to guide interaction between the participants. Dialogs conducted by the system may be used for example for any type of education in any type of school, or in any professional or personal setting. The education provided by the system-conducted dialog may be an initial exposure to material, or it may be a review of material the participant has previously seen or created.

In one or more embodiments, in a first scenario, a teacher uses an embodiment of the system to conduct oral examinations of students to test and reinforce their understanding of written essays they have submitted. In a second scenario, a researcher uses an embodiment of the system to conduct a mock interview to prepare him for an upcoming real interview; this mock interview educates the researcher on the types of questions to expect, and it allows him to review the relevant material that may be mentioned during the interview. The first scenario involves dialogs with multiple participants as well as a moderator (the teacher) who may control (and participate in) the dialogs. The second scenario generates a dialog between the system and a single person (the researcher) without a separate moderator. Embodiments of the invention may generate and conduct dialogs with any number of participants, with or without a moderator.

In the first scenario, students write and submit an essay on an assigned topic, and the system then guides, facilitates, and evaluates oral examinations of the students based on their essays and on other course materials. Embodiments generally utilize initial preparation steps that are performed prior to obtaining student written essays and conducting oral examinations. For example, a teacher uses a computer system equipped with software (which may be a web-based interface, for example) that guides collection of dialog context information that will be used to generate subsequent discussions with students. Some of this information may be entered by the teacher, and some may be obtained directly from other data sources such as class logs or class document repositories. In one embodiment a dialog context is related to a specific assignment that may include reading assigned material and then writing an essay on a specified topic. One or more embodiments may be used in conjunction with any student assignment or assignments, which may include for example, without limitation, readings, experiments, discussions, written essays, tests, videos and individual or group projects.

The dialog context may include a rubric for the course, or for any portion of the course. This rubric may for example describe the course syllabus, the learning outcomes desired for the course, the methods of evaluation that will be used, and the criteria that will be applied to these evaluations. A context may include instructions for one or more reading assignments, and the text of any or all of these readings. These reading assignments may be specifically related to the written assignment, or they may be general reading assignments for the course. The context may include instructions for a writing assignment; the example for this scenario is instructions for a written essay that students are to submit prior to oral examination. For the writing assignment, the context may include suggested literature and references that may be used for the writing assignment. An assignment context may also include any videos or other media that have been assigned for the students to review, transcripts or recordings of past lectures and class notes provided with these lectures, and anticipated learning outcomes for the assignment or for the course overall. These materials shown for dialog context are illustrative; one or more embodiments may use any information related to a course, to an assignment, to student background and knowledge, or to general knowledge in a field of study as part of a dialog context.

One or more embodiments may utilize a computer specifically coded to implement embodiments of the invention detailed herein and may have a data collection user interface that enables entry of some or all of the data. For example, for each element of the context there may be one or more screens that enable data entry or selection or drag-and-drop of relevant files. Some or all of the data may be collected automatically by the computer. In one or more embodiments, some or all of the data may be entered or selected by persons other than teacher, such as teaching assistants, staff, administrators, or students themselves. In one or more embodiments there may be multiple computers that collect data.

In one or more embodiments students prepare and submit their written essays in response to assignment instructions. These essays may be transmitted by students directly to the system or may be collected by teacher who enters them into the system. Each essay may be tagged with the associated student's name. The essays may be transmitted to the AI system.

When the AI system has received dialog context materials, and student essays, then based on these inputs, and on any other information accessible to the AI system, the AI system may then generate questions or interactive discussions for a dialog that test students' knowledge of the material. This dialog may also be used to verify that a student wrote his or her own essay or at least understands the content of that essay. The teacher may moderate this process using interactive controls via the computer. For example, the teacher may use a selection screen to select a student or a group of students for an oral examination. The AI system may then generate a specific initial question for the selected student, based on that student's essay and on the other contextual materials. In one or more embodiments, each student may state the student's name or other identifying information so that the answers are associated with that particular student. In at least one embodiment, each student's voice fingerprint may be stored in any memory within the system including in the Cloud and utilized to later associate answers with that particular student, i.e., when capturing classroom voice audio. In multi-student scenarios, the system can provide evaluation of the class as a whole including knowledge of subject matter and critical thinking skills and degree of participation, i.e., for any or each student and the class as a whole.

In one or more embodiments the teacher may also enter comments into the system while or after the student responds. The AI system may then generate follow-up questions to guide the student through a dialog and may receive and process responses to these follow-up questions. At each step the AI system may use any available information, including dialog context information and the previous questions and responses, to generate the next portion of the dialog. This dialog between the student and the AI system may continue until the AI system determines that it has sufficiently tested the student's knowledge and capabilities, or until the teacher makes this determination.

In one or more embodiments, the AI system may guide conversations that involve multiple students and potentially the teacher as well. The system may generate questions that are directed to specific students, or general questions or topics for conversation that apply to all of the participants. If the system has received voice samples from the students, it may recognize which student is speaking at any time, or if the teacher is speaking. In an illustrative use case, the teacher may relate one student's work to another student's work by selecting both students and indicating that the AI system should generate questions directed to each student that compare and contrast the content of the two student's essays. Each spoken input from each participant may be converted to text, translated if necessary, tagged with the speaker's identity, and input into the AI system.

In one or more embodiments, any or all of the participants (students and teacher) may be at different locations, and communication may occur network links using audio or video communication tools. Audio input and output may be available at each location, and the AI system may transmit audio to these locations and receive audio from these locations.

When a student's oral examination is finished, the teacher may use an input control to ask the AI system to generate an assessment of the student's performance, and potentially to calculate a grade. The assessment may be based on the student's oral responses as well as the student's written essay or other output. The system may be configured to provide assessments in specific areas, such as: ability to summarize the main points and arguments of the reading and essay in a clear and concise manner; ability to explain the relevance and significance of the reading and essay to the course topic or theme; ability to critically analyze and evaluate the strengths and weaknesses of the reading and essay, using evidence and examples to support their claims; ability to synthesize and integrate the ideas from the reading and essay with other sources of information, such as lectures, discussions, or research; ability to apply the concepts and theories from the reading and essay to real-world situations or problems, demonstrating their creativity and problem-solving skills; ability to communicate their thoughts and opinions effectively, using appropriate language, tone, and style for the oral exam context. The teacher may define any other or additional criteria or guidelines for assessment. The AI system may correlate the student's oral responses with the student's written essay to make a determination of whether the student appears to have written original material or instead has plagiarized, copy-and-pasted, or generated all or part of the essay using generative AI. An important issue is whether the user has met the expected outcome, i.e., they understand the material and can use it in novel situations.

In one or more embodiments, the AI system may also be used to evaluate and grade students' written essays or other student output. The AI system may generate this assessment using all of the available information, including the dialog context, the student's essay, other students' essays (for comparative evaluation and grading, for example), and any criteria the teacher or others have specified for evaluating the written assignment. The assessment may include a grade as well as specific comments in areas either selected by the AI system or specified in advance. In one or more embodiments the assessment of the oral examination and the assessment of the written assignment may be combined or cross-referenced.

In a second scenario the dialog conducted by the system is with a single participant who wants to use the dialog to prepare for a future interview. For example, a researcher writes and publishes a paper. A local newspaper publishes an article on the researcher and his latest paper, and a television station makes a request to the researcher for an interview to discuss the topic. The researcher decides that he needs to prepare and practice for the upcoming interview, and he wants to use the AI system to generate a dialog between him and the system to practice with a mock interview. This scenario could also be utilized for practicing for or conducting depositions for example. In either case, the user creates a dialog context with relevant background information, and this context is transmitted to the AI system. The researcher may enter context information using his own computer, or he may instruct the system to collect the relevant data from any sources. In this scenario, the dialog context may include for example, without limitation: background information on the person or organization who will be giving the interview; any topics provided in advance by the interviewer; the article published by the researcher that led to the interview; the newspaper article or any other commentaries that have been made on the researcher's article, wherein the article may include images or drawings that are interpreted by the AI engine in addition to text (as is possible with Google Gemini™ for example); the researcher's other research such as articles, books, lectures, videos; research by others on the same or similar topics; general background information on the topic or field of study; questions the researcher anticipates may be asked by the interviewer; and transcripts or videos of other interviews performed by the interviewer or the interviewer's organization. These components of the dialog context are illustrative; the researcher or other staff may provide any desired information to the AI system to prepare the system for an upcoming dialog.

In this example, a user has a dialog with the AI system, for example in the format of a mock interview to simulate his upcoming television interview. Again, this embodiment could be applied to mock depositions or provide questions for depositions in real time using the context provided by an attorney, patent agent or paralegal. As an illustrative setup, the researcher may use his computer, equipped with a speaker and microphone, as the "interviewer". The computer may be coupled to AI system (or computer 201 may host all or part of the AI system). The AI system may generate questions and process the response, to generate follow-up question and response. This exchange may continue until the AI system, or the user/researcher determine that the mock interview is complete or sufficient. In some situations, the output from the AI system may be displayed as text for the researcher to read, instead of or in addition to as audio output; similarly in some situations the researcher may type his responses instead of or in addition to providing audio responses. Any form of communication between a dialog participant and the AI system may be supported in one or more embodiments of the invention.

After the mock interview is over, the user may ask the AI system to generate an assessment of his performance in the interview. An example assessment may provide feedback on the user's preparedness and knowledge, and on his communication skills and style, organized around topics selected by the AI system or by the researcher himself.

Embodiments of the invention may also be used for other situations that require a dialog that is dependent on a specific context, not just a general context available with current chat bots. Embodiments of the invention apply to any situation where there is a requirement to prove knowledge and understanding of a select population of documents, videos, graphs, images, recorded lectures, etc.

BRIEF DESCRIPTION OF THE DRAWINGS

The above and other aspects, features and advantages of the invention will be more apparent from the following more particular description thereof, presented in conjunction with the following drawings wherein:

FIGS. 1A through 1F show a first illustrative scenario where an embodiment of the invention is used to process students' written essays and to conduct and then evaluate oral exams of each student based on the student's written essay.

FIG. 1A shows context information for the assignment being entered into the system.

FIG. 1B shows the students' written essays being entered into the system.

FIG. 1C shows the teacher selecting a student and the system generating an initial oral question for the student to test his understanding of the assignment and of his writeup.

FIG. 1D shows a continued dialog between the student and the system, as the system interprets the student's responses and asks follow-up questions.

FIG. 1E shows the system grading and assessing the student's performance on his oral exam.

FIG. 1F shows the system grading and assessing a student's written essay.

FIGS. 2A through 2D show a second illustrative scenario where an embodiment of the invention is used to prepare a researcher for an interview to discuss his recent publication.

FIG. 2A shows the scenario that leads to the interview: a researcher publishes a paper; an article on his paper is published in a newspaper; and a television station schedules an interview with the researcher to discuss his work.

FIG. 2B shows the researcher collecting context information and entering this information into the artificial intelligence system to be used in a mock interview to prepare the researcher for the television interview.

FIG. 2C shows the system conducting a mock interview with the researcher.

FIG. 2D shows the researcher asking the system to evaluate his performance in the mock interview.

FIG. 3 shows an architectural block diagram of an illustrative embodiment of the system.

DETAILED DESCRIPTION OF THE INVENTION

Figures 1A, 1B:
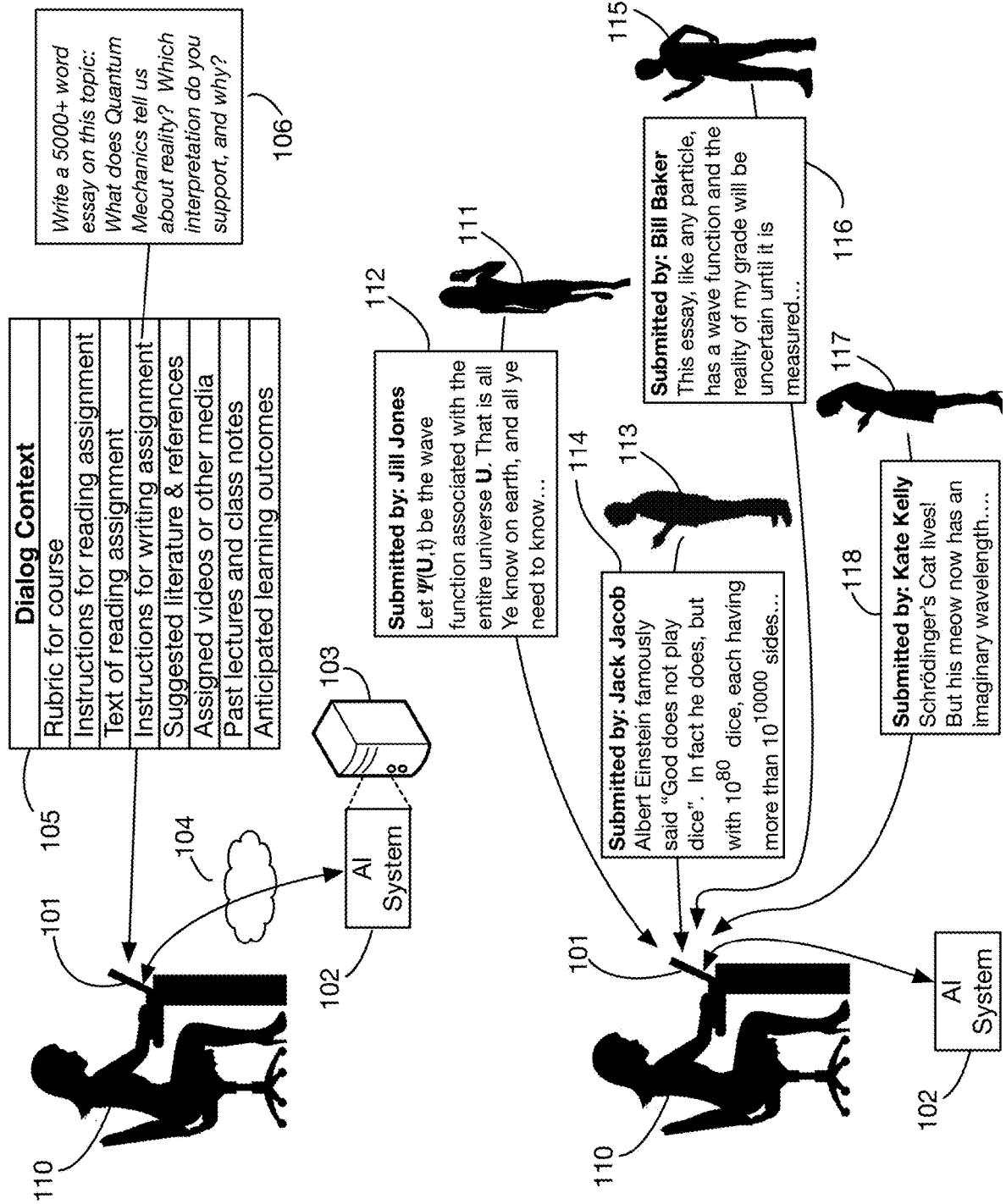

A system that conducts dialogs using artificial intelligence will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention may use an artificial intelligence (AI) engine to guide, facilitate, conduct, and evaluate a dialog between the AI engine and one or more participants. A dialog may be used for example to test a participant's understanding of a subject or of a particular text or output, including the participant's own output. A dialog may be used to explain a subject to one or more participants using a Socratic method of questions and answers, where the questions may be provided by the AI engine. A dialog may be used to help a participant review material and prepare for example for an interview or a subsequent examination, such as a thesis defense. A dialog may for example include an oral examination to confirm that students have written their own essays and have not simply copied-and-pasted material or used an AI system to write their essays, or to verify that they at least understand the material even if they did copy other sources. A dialog managed by the system may have multiple participants, and the system may generate questions and topics to guide interaction between the participants. Dialogs conducted by the system may be used for example for any type of education in any type of school, or in any professional or personal setting. The education provided by the system-conducted dialog may be an initial exposure to material, or it may be a review of material the participant has previously seen or created.

This specification shows two illustrative scenarios for use of embodiments of the system to conduct dialogs. In the first scenario shown in FIGS. 1A through 1F, a teacher uses an embodiment of the system to conduct oral examinations of students to test and reinforce their understanding of written essays they have submitted. In the second scenario shown in FIGS. 2A through 2D, a researcher uses an embodiment of the system to conduct a mock interview to prepare him for an upcoming real interview; this mock interview educates the researcher on the types of questions to expect, and it allows him to review the relevant material that may be mentioned during the interview. The first scenario involves dialogs with multiple participants as well as a moderator (the teacher) who may control (and participate in) the dialogs. The second scenario generates a dialog between the system and a single person (the researcher) without a separate moderator. Embodiments of the invention may generate and conduct dialogs with any number of participants, with or without a moderator.

FIGS. 1A through 1F show the first illustrative scenario for use of an embodiment of the invention. In this scenario, students write and submit an essay on an assigned topic, and the system then guides, facilitates, and evaluates oral examinations of the students based on their essays and on other course materials. The steps shown in this scenario are illustrative; one or more embodiments of the invention may enable any subset or combination of these steps in any order and may enable any additional steps related to generation of dialogs to assess or improve student performance.

FIG. 1A shows initial preparation steps performed prior to obtaining student written essays and conducting oral examinations. A teacher 110 uses a computer system 101 equipped with software (which may be a web-based interface, for example) that guides collection of dialog context information 105 that will be used to generate subsequent discussions with students. Some of this information may be entered by teacher 110, and some may be obtained directly from other data sources such as class logs or class document repositories. In this example the dialog context 105 is related to a specific assignment that may include reading assigned material and then writing an essay on a specified topic. One or more embodiments may be used in conjunction with any student assignment or assignments, which may include for example, without limitation, readings, experiments, discussions, written essays, tests, videos and individual or group projects.

The dialog context 105 may include a rubric for the course, or for any portion of the course. This rubric may for example describe the course syllabus, the learning outcomes desired for the course, the methods of evaluation that will be used, and the criteria that will be applied to these evaluations. Context 105 may include instructions for one or more reading assignments, and the text of any or all of these readings. These reading assignments may be specifically related to the written assignment, or they may be general reading assignments for the course. Context 105 may include instructions for a writing assignment; the example for this scenario is instructions 106 for a written essay that students are to submit prior to oral examination. For the writing assignment 106, the context 105 may include suggested literature and references that may be used for the writing assignment. Assignment context 105 may also include any videos or other media that have been assigned for the students to review, transcripts or recordings of past lectures and class notes provided with these lectures, and anticipated learning outcomes for the assignment or for the course overall. These materials shown for dialog context 105 are illustrative; one or more embodiments may use any information related to a course, to an assignment, to student background and knowledge, or to general knowledge in a field of study as part of a dialog context.

Computer 101 may have a data collection user interface that enables entry of some or all of the data 105. For example, for each element of the context 105 there may be one or more screens that enable data entry or selection or drag-and-drop of relevant files. Some or all of the data may be collected automatically by computer 101. In one or more embodiments, some or all of the data may be entered or selected by persons other than teacher 110, such as teaching assistants, staff, administrators, or students themselves. In one or more embodiments there may be multiple computers 101 that collect data 105.

Information 105 may be transmitted to an artificial intelligence (AI) system 102 for use in subsequent steps as shown in FIGS. 1B through 1F. This AI system may execute on one or more separate computers or processors 103 that are connected to the user computer 101 via a network interface 104, or part or all of the AI system may execute on the user computer 101. AI system 102 may incorporate for example a large language model (LLM), and it may enable analysis of human language input and generation of human language output in response to queries. Illustrative AI systems that may be used in one or more embodiments include ChatGPT™, Google Bard™ and Google Gemini™. AI system 102 may also enable input of data other than human language, such as images, audio, or videos, and generation of media other than text, one embodiment utilized Google Gemini™ to process text, images, audio, and any other type of media. The AI system may include or be coupled to modules or alternatively converters that convert audio speech input into text, and that generate spoken output. It may also include or be connected to language translation modules or converters. In one or more embodiments the AI system may have been trained specifically on the subject matter of the course. The AI system may be guided with prompts that indicate the type of inputs the system should analyze and the type of outputs it should generate.

Computers 101 and 103 may be any type or types of computers or processors, including for example, without limitation, laptops, tablets, phones, desktop computers, server computers, CPUs, GPUs, ASICs, or any network or combination of any of these devices. Each of the systems 101 and 103 may include multiple computers. In one or more embodiments the computers 101 and 103 may be the same hardware or may share hardware. Network links 104 may use any type or types of wired or wireless networks, including local networks and global networks such as the Internet. Software functions may be distributed in any desired manner across processors.

FIG. 1B continues the illustrative scenario of FIG. 1A. Four illustrative students 111, 113, 115, and 117 prepare and submit their written essays 112, 114, 116, and 118, respectively, in response to assignment instructions 106. These essays may be transmitted by students directly to system 101 (or system 103) or may be collected by teacher 110 who enters them into the system. Each essay may be tagged with the associated student's name. The essays may be transmitted to the AI system 102.

In one or more embodiments of the invention, any type of student output in response to an assignment may be input into the system, including but not limited to essays. For example, student output may include, without limitation: written texts of any length and format; responses to test questions that may be in any format such as multiple choice, true/false, fill in blank, or written response; lab notebooks; projects that may include images, audio, video, or text; numerical, mathematical, or symbolic answers, derivations, or calculations; computer programs; musical compositions; or artworks of any form. The scenario shown in FIGS. 1A through 1F uses the example of essays as student output, but similar processing and functionality may be applied to any other type of student output.

Figure 1C:
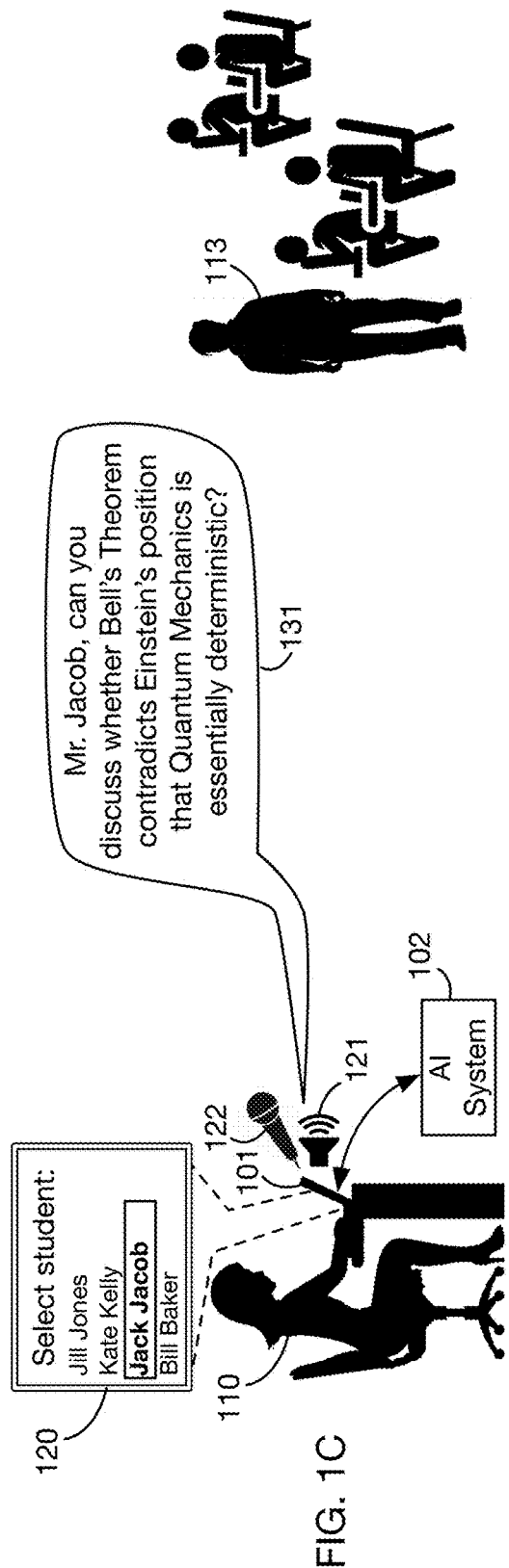

FIG. 1C continues the scenario of FIGS. 1A and 1B. AI system 102 has received dialog context materials 105, and student essays 112, 114, 116, and 118. Based on these inputs, and on any other information accessible to the AI system, the AI system may then generate questions or interactive discussions for a dialog that test students' knowledge of the material. This dialog may also be used to verify that a student wrote his or her own essay or at least understands the content of that essay. Teacher 110 may moderate this process using interactive controls via computer 101. For example, the teacher may use a selection screen 120 to select a student or a group of students for an oral examination. AI system 102 may then generate a specific initial question 131 for the selected student 113, based on that student's essay and on the other contextual materials. In one or more embodiments, the AI system or the computer 101 may be coupled to a speech output module or converter that speaks the question 131 through a speaker 121. In some situations, the AI system may generate question 131 in textual form and the teacher may speak the question. A mixture of teacher speaking, guided by the AI system output, and direct audio output from the computer may be used in one or more embodiments. Teacher 110 may for example turn on or off the automated audio output using dialog controls on computer 110. In one or more embodiments, the AI system may include or may be coupled to language translation modules or converters and information about each student's preferred language may be entered into the system; question 131 and other system responses to the student may then be generated in the student's preferred language. In one or more embodiments, each student may state the student's name or other identifying information so that the answers are associated with that particular student. In at least one embodiment, each student's voice fingerprint may be stored in any memory within the system including in the Cloud and utilized to later associate answers with that particular student, i.e., when capturing classroom voice audio. In multi-student scenarios, the system can provide evaluation of the class as a whole including knowledge of subject matter and critical thinking skills and degree of participation, i.e., for any or each student and the class as a whole.

Figure 1D:

Continuing to FIG. 1D, selected student 113 may make response 132 to question 131. In one or more embodiments the system may be coupled to a microphone 122, and audio of response 132 received by the microphone may be transmitted to the AI system 102. The AI system may contain or be coupled to a speech-to-text module or alternatively converter that transforms the student's spoken response 132 to text. It may also contain or be coupled to language translation modules or alternatively converters that can understand the student's response 132 in various languages. In one or more embodiments, the system may receive one or more voice samples from each student before that student's oral examination; these voice samples may be used to improve speech recognition and also to identify the speaker when multiple students are engaging in a conversation. An illustrative method for obtaining voice samples is to ask each student to read a specific section of text at the beginning of the student's oral exam, if a sample for that student has not been previously provided.

In one or more embodiments the teacher 110 may also enter comments into the system while or after the student responds. AI system 102 may then generate follow-up questions such as question 133 to guide the student through a dialog and may receive and process responses 134 to these follow-up questions. At each step the AI system 102 may use any available information, including dialog context information 105 and the previous questions and responses, to generate the next portion of the dialog. This dialog between the student and the AI system may continue until the AI system determines that it has sufficiently tested the student's knowledge and capabilities, or until teacher 110 makes this determination. Teacher 110 may enter any additional instructions or comments at any time, which may also be transmitted to the AI system as input to the continuing dialog with the student. At any point in the dialog, AI system 102 may generate additional questions or other output using any of the inputs received, including the assignment context 105, the student's essay 114, the student's previous responses to questions, and input from the teacher 110.

In one or more embodiments, the AI system may guide conversations that involve multiple students and potentially the teacher as well. The system may generate questions that are directed to specific students, or general questions or topics for conversation that apply to all of the participants. If the system has received voice samples from the students, it may recognize which student is speaking at any time, or if the teacher is speaking. In an illustrative use case, the teacher may relate one student's work to another student's work by selecting both students and indicating that the AI system should generate questions directed to each student that compare and contrast the content of the two student's essays. Each spoken input from each participant may be converted to text, translated if necessary, tagged with the speaker's identity, and input into the AI system.

In one or more embodiments, any or all of the participants (students and teacher) may be at different locations, and communication may occur network links using audio or video communication tools. Audio input 122 and output 121 may be available at each location, and AI system 102 may transmit audio to these locations and receive audio from these locations.

Figure 1E:
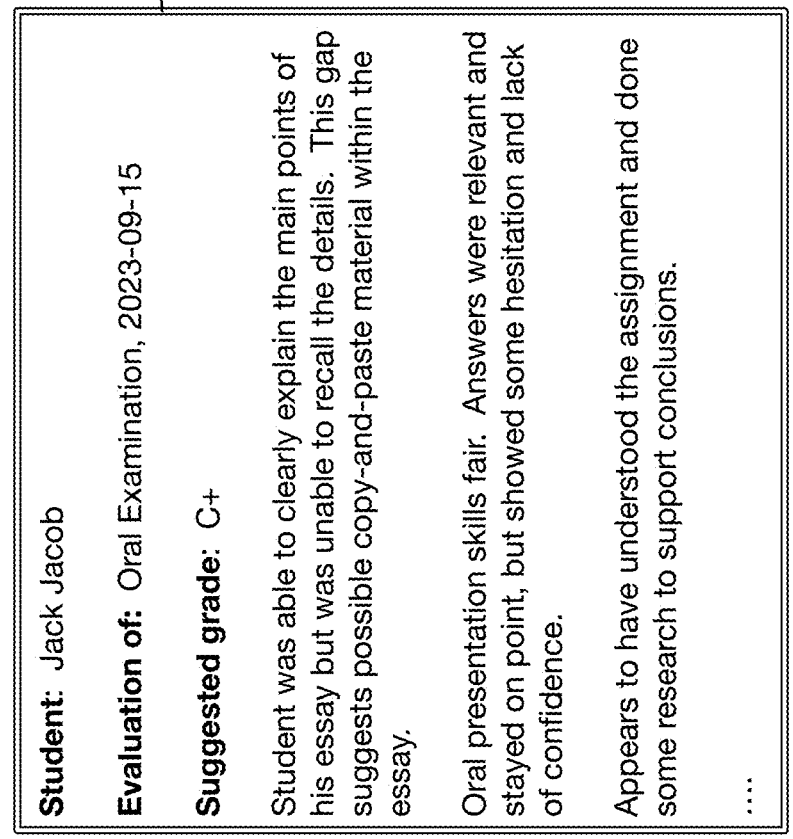
Figure 1E:
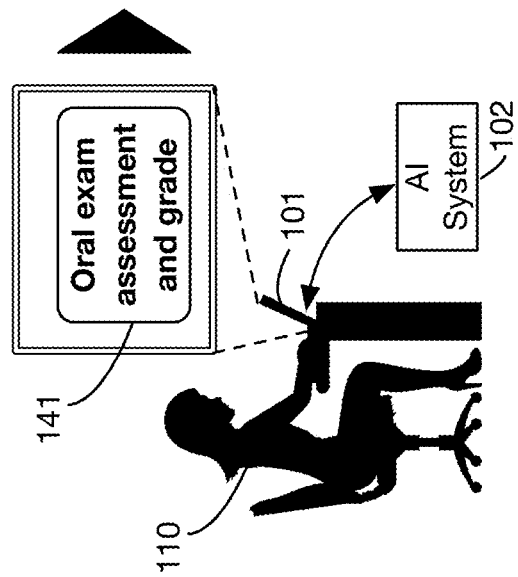

Continuing the scenario in FIG. 1E, when a student's oral examination is finished, teacher 110 may use an input control 141 to ask AI system 102 to generate an assessment of the student's performance, and potentially to calculate a grade. Output 142 from the AI system may contain any types of comments or assessments, qualitative or quantitative. The assessment 142 may be based on the student's oral responses as well as the student's written essay or other output. The system may be configured to provide assessments in specific areas, such as: ability to summarize the main points and arguments of the reading and essay in a clear and concise manner; ability to explain the relevance and significance of the reading and essay to the course topic or theme; ability to critically analyze and evaluate the strengths and weaknesses of the reading and essay, using evidence and examples to support their claims; ability to synthesize and integrate the ideas from the reading and essay with other sources of information, such as lectures, discussions, or research; ability to apply the concepts and theories from the reading and essay to real-world situations or problems, demonstrating their creativity and problem-solving skills; ability to communicate their thoughts and opinions effectively, using appropriate language, tone, and style for the oral exam context. Teacher 110 may define any other or additional criteria or guidelines for assessment. The AI system may correlate the student's oral responses with the student's written essay to make a determination of whether the student appears to have written original material or instead has plagiarized, copy-and-pasted, or generated all or part of the essay using generative AI. An important issue is whether the user has met the expected outcome, i.e., they understand the material and can use it in novel situations.

In one or more embodiments, the AI system may also be used to evaluate and grade students' written essays or other student output. This capability is illustrated in FIG. 1F, which continues the scenario of FIGS. 1A through 1E. Teacher 110 uses control 151 to generate an assessment 152 of the student's written essay. The AI system 102 may generate this assessment 152 using all of the available information, including the dialog context, the student's essay, other students' essays (for comparative evaluation and grading, for example), and any criteria the teacher or others have specified for evaluating the written assignment. The assessment 152 may include a grade as well as specific comments in areas either selected by the AI system or specified in advance. In one or more embodiments the assessment 142 of the oral examination and the assessment 152 of the written assignment may be combined or cross-referenced.

Figure 2C:
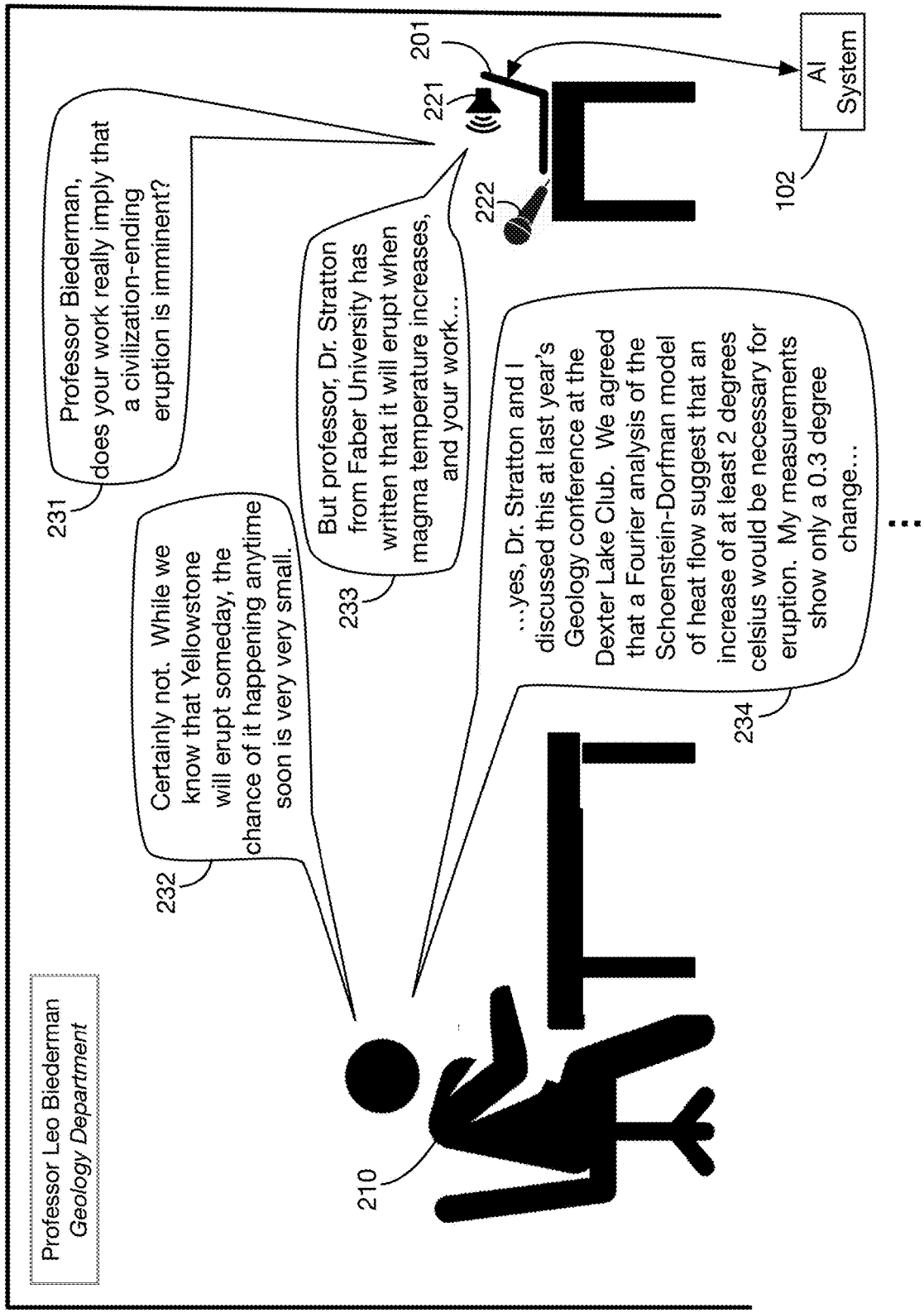

FIGS. 2A through 2D show a second illustrative scenario for use of an embodiment of the invention. In this scenario the dialog conducted by the system is with a single participant who wants to use the dialog to prepare for a future interview. FIG. 2A shows the background for this scenario. A researcher 210 writes and publishes a paper 212. A local newspaper 213 publishes an article on the researcher and his latest paper, and a television station 214 makes a request 215 to the researcher for an interview to discuss the topic. Continuing in FIG. 2B, the researcher decides that he needs to prepare and practice for the upcoming interview, and he wants to use AI system 102 to generate a dialog between him and the system to practice with a mock interview. He creates dialog context 205 with relevant background information, and this context is transmitted to AI system 102. The researcher may enter context information using his own computer 201, or he may instruct the system to collect the relevant data from any sources. In this scenario, dialog context 205 may include for example, without limitation: background information on the person or organization who will be giving the interview; any topics provided in advance by the interviewer; the article 212 published by the researcher that led to the interview; the newspaper article 213 or any other commentaries that have been made on the researcher's article, wherein the article may include images or drawings that are interpreted by the AI engine in addition to text (as is possible with Google Gemini™ for example); the researcher's other research such as articles, books, lectures, videos; research by others on the same or similar topics; general background information on the topic or field of study; questions the researcher anticipates may be asked by the interviewer; and transcripts or videos of other interviews performed by the interviewer or the interviewer's organization. These components of the dialog context 205 are illustrative; the researcher 210 or other staff may provide any desired information to AI system 102 to prepare the system for an upcoming dialog.

In FIG. 2C, researcher 210 has a dialog with AI system 102, in the format of a mock interview to simulate his upcoming television interview. As an illustrative setup, the researcher may use his computer 201, equipped with a speaker 221 and microphone 222, as the "interviewer". Computer 201 may be coupled to AI system 102 (or computer 201 may host all or part of the AI system). The AI system may generate questions such as 231, and process the response 232, to generate follow-up question 233 and response 234. This exchange may continue until the AI system or the researcher determine that the mock interview is complete or sufficient. In some situations, the output from the AI system may be displayed as text for the researcher to read, instead of or in addition to as audio output; similarly in some situations the researcher may type his responses instead of or in addition to providing audio responses. Any form of communication between a dialog participant and the AI system may be supported in one or more embodiments of the invention.

In FIG. 2D, after the mock interview is over, researcher 210 uses control 241 to ask AI system 102 to generate an assessment 242 of his performance in the interview. Illustrative assessment 242 may for example provide feedback on the researcher's preparedness and knowledge, and on his communication skills and style, organized around topics selected by the AI system or by the researcher himself.

The two scenarios presented in FIGS. 1A through 1F and in FIGS. 2A through 2D show illustrative dialogs; one or more embodiments of the invention may use an AI engine to plan, organize, conduct, moderate, or evaluate any type of dialog that educates any participant or participants on any selected topic or topics. Dialogs may or may not have one or more moderators, such as a teacher. Dialogs may be based on any contextual information, such as background information on the topic or topics of discussion, and output generated by dialog participants. The AI engine may learn additional context as a dialog proceeds in order to ask relevant follow-up questions based on participants' previous responses.

FIG. 3 shows an architectural diagram of illustrative components of one or more embodiments of the invention. AI system 102 may be any component or components that creates output in response to inputs and control prompts. It may be for example a generative system such as any variation or type of GPT (generative pre-trained transformers), which may for example include any type of LLM (large language model). The system may include one or more prompts 311 to AI system 102 for the generation of dialog questions or topics, and one or more prompts 321 to the AI system for the generation of assessments of the participants' performance or of other outputs. The system may include a data collection interface 301 through which dialog context information may be entered or obtained, and through which output generated by the participants may be input. One or more embodiments of data collection interface 301 may include an image interpreter that is configured to understand images and update dialog context based on the interpreted images. One or more embodiments may include the interpreter within the AI system 102, i.e., for example Google Gemini™. Illustrative dialog contexts include context 105 for the first scenario of student oral exams, and context 205 for the second scenario of a mock interview of a researcher. Illustrative output from participants includes essay 112 from a student in the first scenario, and published research paper 212 from a researcher in the second scenario.

The system may also include a moderator control interface 302 that a moderator may use to guide the processes that use the AI system 102 to generate output such as dialog questions and assessments. Some dialogs may not have a moderator. In some situations a moderator may also be a participant in the dialog. Moderator inputs may include inputs 303 to moderate discussions during dialogs, such as selection of which participant or participants should participate in the next portion of a dialog, and input on whether a dialog session should conclude. Moderator inputs may also include inputs 304 to control when assessments should be generated and to define or suggest criteria and guidelines for these assessments.

AI system 102 may also include or be coupled to a text-to-speech module 312 and a speech-to-text module 313. Modules as used throughout may alternatively be implemented as non-transitory source code in the memory of a computer specifically coded to perform a given function. These modules may be configured with the preferred languages of the participants 314, and they may include translation capabilities to understand various languages and to convert between a native language of the AI system and the languages of the participants. The text-to-speech module 312 may be used to generate spoken questions (such as 131 in scenario one and 231 in scenario two) given to participants during dialogs, and the speech-to-text module 313 may be used to receive and comprehend participants' answers (such as 132 in scenario one and 232 in scenario two). Samples 315 of the voices of each participant may be input into the voice-to-text module 313 so that this module can identify the speaker.

The modules and subsystems shown in FIG. 3 are illustrative; embodiments of the invention may contain any subset of these modules, or additional capabilities. The modules may be implemented in software or hardware or a combination thereof. They may be distributed in any manner across different processors, including for example a client computer used by a moderator and one or more server computers that host the AI system 102. Modules may be combined or organized in any desired manner.

Embodiments of the invention may also be used for doctoral thesis defense and depositions in litigation. This invention applies to any situation where there is a requirement to prove knowledge and understanding of a select population of documents, videos, graphs, images, recorded lectures, etc. Embodiments may be implemented as an SAAS system that utilizes the cloud to utilize any type of media including text and videos (URLs from video websites and elsewhere), URLs of research articles and journal articles as well as the lay press. Embodiments may also utilize entire textbooks or chapters via an encryption from the publisher when the printed info has copyright protection.

While the invention herein disclosed has been described by means of specific embodiments and applications thereof, numerous modifications and variations could be made thereto by those skilled in the art without departing from the scope of the invention set forth in the claims.

What is claimed is:

1. A system that conducts dialogs using artificial intelligence, comprising:
an artificial intelligence engine comprising
a processor; and
a large language model;
at least one converter coupled to said artificial intelligence engine; and,
a data collection user interface configured to accept a dialog context and to transmit said dialog context to said artificial intelligence engine;
wherein
said artificial intelligence engine is configured to
receive said dialog context;
generate questions for one or more dialog participants based on said dialog context and based on previous responses of said one or more dialog participants,
wherein said dialog context is received and entered into said data collection user interface prior to a dialog between said one or more dialog participants,
wherein said dialog context comprises information that is configured to be received from one or more of
a user other than said one or more dialog participants,
other data sources other than said one or more dialog participants; and
transmit said questions to said at least one converter;
wherein said at least one converter is configured to
output said questions to said one or more dialog participants; and,
receive responses from said one or more dialog participants; and,
transmit said responses to said artificial intelligence engine; and,
wherein said artificial intelligence engine is further configured to
generate one or more evaluations of said one or more dialog participants based on said responses that are transmitted to said artificial intelligence engine and on said dialog context;
wherein said at least one converter comprises a speech-to-text converter, and the at least one converter comprising said speech-to-text converter is further configured to
receive a voice sample from each of said one or more dialog participants;
identify a dialog participant associated with each of said responses from said one or more dialog participants; and,
transmit said dialog participant to said artificial intelligence engine.

2. The system that conducts dialogs using artificial intelligence of claim 1, wherein said questions comprise text questions, wherein said at least one converter comprises a text-to-speech converter, and wherein said at least one converter comprising said text-to-speech converter is further configured to transform said text questions to audio questions such that said questions that are output to said one or more dialog participants are audio questions.

3. The system that conducts dialogs using artificial intelligence of claim 1, wherein said responses from said one or more dialog participants are audio responses, wherein said at least one converter comprises a speech-to-text converter, and wherein said at least one converter comprising said speech-to-text converter is further configured to transform said audio responses to text responses such that said responses that are transmitted to said artificial intelligence engine are said audio responses, and such that said generate said one or more evaluations of said one or more dialog participants via said artificial intelligence engine is based on said text responses and on said dialog context.

4. The system that conducts dialogs using artificial intelligence of claim 1, further comprising
a moderator user interface configured to accept commands to perform one or more of
selection of said one or more dialog participants;
starting said dialog;
terminating said dialog;
generating said one or more evaluations.

5. The system that conducts dialogs using artificial intelligence of claim 1,
wherein said dialog context comprises one or more of
written output generated by said one or more dialog participants;
a course rubric;
assignment instructions;
class notes;
class lectures;
anticipated learning outcomes;
background information on a discussion topic.

6. The system that conducts dialogs using artificial intelligence of claim 1, wherein
said at least one converter comprises a speech-to-text converter, and the at least one converter comprising said speech-to-text converter is further configured to
translate said questions that are generated into a preferred language of said one or more dialog participants; and,
translate said responses, that are transmitted to said artificial intelligence engine, from said preferred language of said one or more dialog participants.

7. The system that conducts dialogs using artificial intelligence of claim 1, wherein
said at least one converter comprises a speech-to-text converter, and the at least one converter comprising said speech-to-text converter is further configured to
identify said one or more dialog participants by comparing previous audio associated with said one or more dialog participants with said responses that are received from said one or more dialog participants.

8. The system that conducts dialogs using artificial intelligence of claim 1, wherein
said at least one converter comprises a speech-to-text converter, and the at least one converter comprising said speech-to-text converter is further configured to
identify said one or more dialog participants by analyzing said responses that are received from said one or more dialog participants to determine a name associated with said responses.

9. The system that conducts dialogs using artificial intelligence of claim 1, wherein said one or more evaluations comprises a combined evaluation of a plurality of said one or more dialog participants based on said responses that are transmitted to said artificial intelligence engine and on said dialog context.

10. The system that conducts dialogs using artificial intelligence of claim 1, further comprising an image interpreter configured to obtain an image, wherein said image interpreter is coupled with or is within said artificial intelligence engine; and,
wherein said artificial intelligence engine in configured to update said dialog context based on said image.

11. A system that conducts dialogs using artificial intelligence, comprising:
an artificial intelligence engine comprising
a processor; and
a large language model;
at least one converter coupled to said artificial intelligence engine; and,
a data collection user interface configured to accept a dialog context and to transmit said dialog context to said artificial intelligence engine;
wherein
said artificial intelligence engine is configured to
receive said dialog context;
generate text questions for one or more dialog participants based on said dialog context and based on previous responses of said one or more dialog participants,
wherein said dialog context is received and entered into said data collection user interface prior to a dialog between said one or more dialog participants,
wherein said dialog context comprises information that is configured to be received from one or more of
a user other than said one or more dialog participants,
other data sources other than said one or more dialog participants; and
transmit said text questions to said at least one converter;
wherein said at least one converter is configured to
transform said text questions to audio questions; and
output said audio questions to said one or more dialog participants;
receive audio responses from said one or more dialog participants;
transform said audio responses to text responses; and
transmit said text responses to said artificial intelligence engine; and,
wherein said artificial intelligence engine is further configured to
generate one or more evaluations of said one or more dialog participants based on said text responses and on said dialog context;
wherein said at least one converter is further configured to
receive a voice sample from each of said one or more dialog participants; identify a dialog participant associated with each of said audio responses; and,
transmit said dialog participant to said artificial intelligence engine;
wherein said at least one converter comprises a speech-to-text converter, and the at least one converter comprising said speech-to-text converter is further configured to
receive a voice sample from each of said one or more dialog participants;
identify a dialog participant associated with each of said responses from said one or more dialog participants; and,
transmit said dialog participant to said artificial intelligence engine.

12. A system that conducts dialogs using artificial intelligence, comprising:
an artificial intelligence engine comprising
a processor; and
a large language model;

at least one converter coupled to said artificial intelligence engine; and, a data collection user interface configured to accept a dialog context and to transmit said dialog context to said artificial intelligence engine;

wherein said artificial intelligence engine is configured to receive said dialog context;

generate questions for one or more dialog participants based on said dialog context and based on previous responses of said one or more dialog participants, wherein said dialog context is received and entered into said data collection user interface prior to a dialog between said one or more dialog participants, wherein said dialog context comprises information that is configured to be received from one or more of a user other than said one or more dialog participants, other data sources other than said one or more dialog participants; and transmit said questions to said at least one converter;

wherein said at least one converter is configured to output said questions to said one or more dialog participants; and, receive responses from said one or more dialog participants; and, transmit said responses to said artificial intelligence engine; and, wherein said artificial intelligence engine is further configured to generate one or more evaluations of said one or more dialog participants based on said responses that are transmitted to said artificial intelligence engine and on said dialog context;

wherein said at least one converter comprises a speech-to-text converter, and the at least one converter comprising said speech-to-text converter is further configured to identify said one or more dialog participants by comparing previous audio associated with said one or more dialog participants with said responses that are received from said one or more dialog participants.

13. The system that conducts dialogs using artificial intelligence of claim 12, wherein said questions comprise text questions, wherein said at least one converter comprises a text-to-speech converter, and wherein said at least one converter comprising said text-to-speech converter is further configured to transform said text questions to audio questions such that said questions that are output to said one or more dialog participants are audio questions.

14. The system that conducts dialogs using artificial intelligence of claim 12, wherein said responses from said one or more dialog participants are audio responses, and wherein said at least one converter comprising said speech-to-text converter is further configured to transform said audio responses to text responses such that said responses that are transmitted to said artificial intelligence engine are said audio responses, and such that said generate said one or more evaluations of said one or more dialog participants via said artificial intelligence engine is based on said text responses and on said dialog context.

15. The system that conducts dialogs using artificial intelligence of claim 12, further comprising a moderator user interface configured to accept commands to perform one or more of selection of said one or more dialog participants;

starting said dialog;

terminating said dialog;

generating said one or more evaluations.

16. The system that conducts dialogs using artificial intelligence of claim 12, wherein said dialog context comprises one or more of written output generated by said one or more dialog participants;

a course rubric;

assignment instructions;

class notes;

class lectures;

anticipated learning outcomes;

background information on a discussion topic.

17. The system that conducts dialogs using artificial intelligence of claim 12, wherein the at least one converter comprising said speech-to-text converter is further configured to translate said questions that are generated into a preferred language of said one or more dialog participants; and, translate said responses, that are transmitted to said artificial intelligence engine, from said preferred language of said one or more dialog participants.

18. The system that conducts dialogs using artificial intelligence of claim 12, wherein the at least one converter comprising said speech-to-text converter is further configured to identify said one or more dialog participants by analyzing said responses that are received from said one or more dialog participants to determine a name associated with said responses.

19. The system that conducts dialogs using artificial intelligence of claim 12, wherein said one or more evaluations comprises a combined evaluation of a plurality of said one or more dialog participants based on said responses that are transmitted to said artificial intelligence engine and on said dialog context.

20. The system that conducts dialogs using artificial intelligence of claim 12, further comprising an image interpreter configured to obtain an image, wherein said image interpreter is coupled with or is within said artificial intelligence engine; and, wherein said artificial intelligence engine in configured to update said dialog context based on said image.

21. A system that conducts dialogs using artificial intelligence, comprising:

an artificial intelligence engine comprising a processor; and a large language model;

at least one converter coupled to said artificial intelligence engine; and, a data collection user interface configured to accept a dialog context and to transmit said dialog context to said artificial intelligence engine;

wherein said artificial intelligence engine is configured to receive said dialog context;

generate text questions for one or more dialog participants based on said dialog context and based on previous responses of said one or more dialog participants, wherein said dialog context is received and entered into said data collection user interface prior to a dialog between said one or more dialog participants, wherein said dialog context comprises information that is configured to be received from one or more of a user other than said one or more dialog participants, other data sources other than said one or more dialog participants; and transmit said text questions to said at least one converter;

wherein said at least one converter is configured to transform said text questions to audio questions; and output said audio questions to said one or more dialog participants;

receive audio responses from said one or more dialog participants;

transform said audio responses to text responses; and transmit said text responses to said artificial intelligence engine; and, wherein said artificial intelligence engine is further configured to generate one or more evaluations of said one or more dialog participants based on said text responses and on said dialog context;

wherein said at least one converter is further configured to receive a voice sample from each of said one or more dialog participants; identify a dialog participant associated with each of said audio responses; and, transmit said dialog participant to said artificial intelligence engine;

wherein said at least one converter comprises a speech-to-text converter, and the at least one converter comprising said speech-to-text converter is further configured to identify said one or more dialog participants by comparing previous audio associated with said one or more dialog participants with said responses that are received from said one or more dialog participants.

* * * * *